United States Patent [19]

Takegami et al.

[11] 4,081,403

[45] Mar. 28, 1978

[54] ADSORBENT FOR THE TREATMENT OF WASTE WATER

[75] Inventors: Shinsuke Takegami; Takashi Korenaga; Chiharu Yoshinaga, all of Okayama, Japan

[73] Assignee: Japan Exlan Company Limited, Osaka, Japan

[21] Appl. No.: 736,528

[22] Filed: Oct. 28, 1976

[30] Foreign Application Priority Data

Nov. 11, 1975 Japan ................................ 50-135953

[51] Int. Cl.$^2$ ......................... B01J 31/02; C02B 1/14; B01D 15/00; C04B 31/40
[52] U.S. Cl. .................................. 252/428; 252/426; 210/40; 210/192; 106/308 Q; 106/288 B
[58] Field of Search ................... 252/426, 428, 429 R; 210/40, 192; 106/308 Q, 288 B

[56] References Cited

U.S. PATENT DOCUMENTS

| | | | |
|---|---|---|---|
| 2,291,226 | 7/1942 | Higgins | 252/426 |
| 3,998,756 | 12/1976 | Sutherland | 252/422 |

*Primary Examiner*—Patrick P. Garvin
*Assistant Examiner*—William G. Wright
*Attorney, Agent, or Firm*—Wenderoth, Lind & Ponack

[57] ABSTRACT

The invention provides an adsorbent suitable for column packing which is composed of a granular material obtained by subjecting a mixture of an activated sludge-containing material and a primary condensate of a formaldehyde type resin and/or a dialdehyde compound to heat-curing and granulating. The adsorbent can advantageously be used to treat industrial waste water containing ionic or nonionic water pollutants such as heavy metal ions, dyes, surfactants, high molecular weight coagulants and mineral oils.

11 Claims, No Drawings

ADSORBENT FOR THE TREATMENT OF WASTE WATER

BACKGROUND OF THE INVENTION

1. Field of the Invention

The present invention relates to an adsorbent for treating waste water and more particularly to an adsorbent suitable for column packing which is composed of a granular material obtained by subjecting a particular mixture composed mainly of activated sludge to a heat curing treatment and to a granulating operation, which adsorbent can advantageously be used to treat industrial waste water containing ionic or nonionic water pollutants such as heavy metal ions, dyes, surfactants, high molecular weight coagulants and mineral oils.

2. Description of the Prior Art

The waste water disposal system which treats organic waste water such as civil sewage, human waste, industrial waste water, etc. with activated sludge to reduce the BOD (biochemical oxygen demand) and COD (chemical oxygen demand) is one of the waste water purification techniques generally practiced. In this treatment system, a large amount of excess activated sludge is accumulated with the passage of time, so that the disposal of the excess activated sludge is a great problem. Several attempts to utilize such excess activated sludge are being made: the use as a slow-acting organic fertilizer or soil improver because of its richness in the three important elements of fertilizer, i.e. nitrogen, phosphorus and potassium; the use as feed for animals because it is composed mainly of proteins and hydrocarbons; and the use for removing ionic substances in industrial waste water, utilizing its ampho-ionic properties.

In any of the above-mentioned uses, there is extreme difficulty in handling the activated sludge when it is used after it is removed from the treatment process, and particularly, when industrial waste water is subjected to a column treatment which uses activated sludge, it is necessary to granulate the activated sludge. However, activated sludge formed into granules after dehydration and drying has a fatal drawback that the granules are liable to fracture in water, in addition to their having a small mechanical strength (compressive strength, etc.), so that it has been utterly impossible to use such granules for column packing.

STATEMENT OF THE INVENTION

In view of such a situation, we conducted intensive research to prepare activated sludge granules which can be advantageously used for column packing. As a result, it has been found that granules containing activated sludge, obtained by uniformly mixing specific amounts of the water-soluble primary condensate of a formaldehyde type resin and/or a dialdehyde compound, an optionally a carbonate and/or a water-soluble polymer, with an activated sludge-containing material, and subjecting the mixture to a particular heat curing treatment and a granulating operation, have excellent chemical and physical adsorbing power, high mechanical strength, and excellent resistance to fracture in water. The present invention is based on this finding.

The main object of the present invention is, therefore, to provide an adsorbent for the treatment of waste water which is very easy to handle and is very suitable for column packing.

Another object of the present invention is to provide an adsorbent for column packing which can advantageously be used to treat industrial waste water containing heavy metal ions, dyes, surfactants and mineral oils, and which is inexpensive and can be used in an industrial manner.

Other objects of the present invention will become apparent from the following detailed explanation of the invention.

These objects of the invention are attained by using activated sludge-containing granules obtained by subjecting a mixture of 100 weight parts, based on the dry matter, of an activated sludge-containing material with at least 5 weight parts of the water-soluble primary condensate of a formaldehyde type resin and/or a dialdehyde compound to a heat curing treatment at 60° to 250° C. and a granulating operation. The objects and effects of the present invention can be more effectively attained by uniformly mixing with the activated sludge-containing material, at least 0.5 weight part, for 100 weight parts of said material, of a carbonate and/or a water-soluble polymer and where the carbonate is mixed, further subjecting the granules after the heat curing treatment to treatment with an acid liquid.

The granular adsorbent according to the present invention combines a very high chemical adsorbing power resulting from the amphoteric properties of the activated sludge and an excellent physical adsorbing power derived from its inner structure, so that it is very advantageously used for the disposal of industrial waste water containing ionic or nonionic water pollutants such as heavy metal ions, dyes, surfactants, high molecular weight coagulants and mineral oils, for example fuel oil. In the heating operation which may be carried out during granulating of the adsorbent, the primary condensate of a formaldehyde type resin and/or the dialdehyde compound condenses and polymerizes to act as a binder for adhering the activated sludge to itself. Therefore, the granules have excellent mechanical strength (resistance to abrasion, compressive strength, etc.) and are not liable to fracture in water because of their water resistance, so that the granules are very suitable as an adsorbent for the column treatment of industrial waste water.

Considering that the present invention enables the effective utilization of excess activated sludge, which itself is an industrial waste, and that the adsorbent having excellent abilities can be inexpensively produced from such sludge, the present invention has an extremely high industrial and social importance.

DESCRIPTION OF PREFERRED EMBODIMENT

The activated sludge-containing material as referred to in the present invention is a generic term for the product formed by the activated sludge treatment of organic waste water such as civil sewage, industrial waste water, etc. (including activated sludge returned into the process cycle), especially excess activated sludge slurry (a wet muddy material), its dried matter and the solid substance obtained by subjecting the sludge slurry to operations such as coagulation, filtration, drying, etc. It is particularly preferable for the attainment of the objects and effects of the present invention to use the activated sludge formed by the activated sludge treatment of industrial waste water discharged from acrylic fiber production plants.

The primary condensate of a formaldehyde type resin used in the present invention is a water-soluble primary condensate which is obtained by reacting formaldehyde with a phenolic compound such as phenol, cresol, and resorcin; and/or an amino compounds such as urea, melamine, and aniline, and which can be condensed and cured by heating. For the purpose of convenience, the primary condensate of a formaldehyde type resin is abbreviated hereinafter as the water-soluble primary condensate.

The dialdehyde compounds used in the present invention are those containing two aldehyde groups in one molecule and include, for example, glyoxal, malondialdehyde, succindialdehyde and phthaldialdehyde. Among these, glyoxal is particularly preferred.

The water-soluble primary condensate and the dialdehyde compound can be used singly or as an aqueous solution, but in order to obtain a more uniform mixture, it is preferable to use them as an aqueous solution.

Such an activated sludge-containing material is mixed uniformly in the usual way with the water-soluble primary condensate and/or the dialdehyde compound. As regards the mixing ratio, it is necessary to mix uniformly at least 5 weight parts, preferably 10 to 100 weight parts, of the primary condensate and/or the dialdehyde with 100 parts, based on the dry matter, of the activated sludge. Where the mixing ratio of the primary condensate and/or the dialdehyde compound is less than 5 weight parts, it is difficult to elevate the mechanical strength (especially compressive strength) of the adsorbent granules. When the activated sludge-containing material is in a wet state, it is necessary to suitably determine the mixing ratio of the primary condensate and/or the dialdehyde compound so as to satisfy the abovementioned condition by calculating the weight of the wet activated sludge-containing material on the basis of its dry matter weight.

In order to produce an adsorbent having a more excellent adsorbing power, it is important to add uniformly a carbonate and/or a water-soluble polymer to the mixture of the activated sludge-containing material and the water-soluble primary condensate and/or the dialdehyde compound, in an amount of at least 0.5 weight part, preferably 5 to 30 weight parts, for 100 parts of said sludge-containing material. Where the mixing ratio is less than 0.5 weight part, it is difficult to make the inner structure of the adsorbent granules porous, so that such a mixing ratio is not desirable. Where, as mentioned earlier, a carbonate is compounded with the mixture of the activated sludge-containing material with the water-soluble primary condensate and/or the dialdehyde compound, it is necessary to subject the granules obtained by the later-mentioned heat curing treatment to an acid solution treatment. By this treatment, carbonic acid gas is generated, whereby the porosity of the granules is promoted, so that the properties of the granules as an adsorbent can be improved to a further extent. The carbonate and the water-soluble polymer used in the present invention are not particularly limited. For example, there may be mentioned well-known carbonates such as sodium carbonate, sodium hydrogen carbonate, potassium carbonate, potassium hydrogen carbonate, ammonium carbonate, ammonium hydrogen carbonate, magnesium carbonate, and calcium carbonate; and water-soluble polymers such as polyvinyl alcohol, polyacrylic acid, polyvinylpyrrolidone, polyacrylamide, polyethylene glycol, polystyrenesulfonic acid, polyvinyl acetate, carboxymethyl cellulose, starch, alginic acid, pectinic acid, humic acid, and agar-agar. The acid used for the acid solution treatment may be any usual acid, for example inorganic acids such as hydrochloric acid, sulfuric acid, and nitric acid, and organic acids such as acetic acid, and paratoluenesulfonic acid. Also, the acid concentration used is not particularly limited, but it is generally preferable to treat with an acid liquid (particularly an aqueous acid solution) having a pH below 6.0.

The mixture of the activated sludge-containing material with the water-soluble primary condensate and/or the dialdehyde compound, or the compounded product of said mixture to which a carbonate and/or a water-soluble polymer has been added, is then subjected to a heat curing treatment at 60° to 250° C. and a granulating operation so as to form it into granules. In the heat curing treatment, where the treating temperature is lower than 60° C., the primary condensate and/or the dialdehyde compound cannot sufficiently polymerize, and therefore it becomes difficult to give a sufficient granule strength to the granules. On the other hand, where the heating temperature is in excess of 250° C., the mixture of the compounded product itself is decomposed by heat, whereby the mechanical properties and the chemical adsorbing power of the granules are lowered, and therefore such a temperature is not desirable. The apparatus used for the heat curing treatment and the granulating operation according to the present invention can be arbitrarily selected from those conventionally used.

To facilitate the curing treatment and the granulating operation, it is desirable to remove excess water contained in said mixture or compounded product by a suitable method prior to heat curing and granulating, so that the water content in said mixture or the compounded product should be adjusted to about 40 to 80 percent.

The granulating operation is performed during the heat curing treatment or at any time before or after the heat curing treatment by means of a known granulating apparatus (machine). Depending on the intended objects, the mixture or the compounded product is formed into various shapes of granules.

The granules thus obtained containing the activated sludge can pass through a sieve having a 12–32 mesh. They have a uniform granule shape and are excellent in mechanical strength, so that they are very suitable as an adsorbent for the column treatment of industrial waste water.

In the actual practice of the treatment of industrial waste water by using the adsorbent obtained by the present invention, it is desirable to suitably adjust the pH of the waste water in accordance with the kind of the water pollutants (substances to be adsorbed) present in the waste water. For example, when the water pollutants are cationic substances such as heavy metal ions, cationic dyes, and cationic surfactants, the pH of the waste water should be adjusted to a value above the isoelectric point (the pH value at which the positive and negative dissociation constants in the activated sludge having ampho-ionic properties become equal; usually existing in the pH range of 4 to 6); when the pollutants are anionic substances such as anionic dyes, anionic high molecular weight coagulants, the pH should be adjusted to a value below the isoelectric point; and when the pollutants are nonionic substances such as mineral oils, for example fuel oil, the pH should be adjusted to a value in the vicinity of the isoelectric point. By such adjustment of the pH of the waste water, it becomes possible to display the adsorbing power of the adsorbent more effectively.

By following the present invention, it becomes possible to advantageously obtain an adsorbent having a high industrial utility value and having an excellent adsorbing power from excess activated sludge which has heretofore been of no utility value. Therefore, the industrial and social importance of the present invention should be valued very highly.

The following examples are described for a better understanding of the present invention and are not intended for limiting the scope of the invention. All parts and percentages in the examples are by weight unless otherwise specified.

The evaluation of the adsorbing power for heavy metal ions in the following examples was made by the following simple method: A 100 ml aqueous solution (pH 6-7) containing 10 p.p.m. of heavy metal ions was prepared for various kinds of heavy metal ions, respectively. Then 100 mg of the adsorbent was put into the aqueous solution, and after stirring the solution for one hour, the adsorbent was filtered off and the concentration of the heavy metal ions remaining in the filtrate was determined by atomic absorption spectrometry (in the case of Hg ions), polarography (in the case of Pb and Cd ions) or spectrophotometry (in the case of Co ions).

EXAMPLE 1

Two hundred parts of an excess activated sludge slurry (solid matter content 8.2%) formed by the activated sludge treatment of industrial waste water from an acrylic fiber plant, was mixed with 1.64 parts of the water-soluble primary condensate of melamine resin (Sumirates Resin 607 produced by Sumitomo Chemical Co., Ltd.). After the mixture thus obtained was dried until its water content became 50%, the mixture was supplied to an extruder (produced by Fuji Powdal Co.) to form fine noodles having a diameter of 1 mm. The fine noodles were supplied to a granulating machine (Marumerizer produced by Fuji Powdal Co.) to produce activated sludge-containing granules that can pass through a 12–32 mesh filter. Thereafter, the granules thus obtained were subjected to a heat curing treatment at 100° C. for 2 hours to obtain the final product (adsorbent). The granules were water-resistant, so they did not collapse when immersed in water. Also, they had an excellent mechanical strength. The adsorbing power for heavy metal ions was evaluated using the granules. The results shown in Table 1 were obtained for various heavy metal ions.

For comparison, Table 1 shows the results when using as the adsorbent a mixture of a sandy substance and sludge granules produced from excess sludge by merely dehydrating, drying and granulating the mixture, the mixing ratio of the sludge granules being 7%.

Table 1

|  | Ratio (%) of heavy metal ions caught by each adsorbent | | |
| --- | --- | --- | --- |
|  | Pb | Cd | Co |
| Present invention | 94.7 | 93.1 | 86.0 |
| Comparative example | 35.0 | 32.0 | 25.5 |

From the results shown in Table 1, it is apparent that the granules according to the present invention display the excellent adsorbing effect derived from their excellent chemical and physical adsorbing power.

Columns each packed with the same amount of the granules or sandy substance containing the above-mentioned activated sludge were prepared. Each of the above-mentioned various heavy metal ion solutions in an amount of 20 times the amount of the adsorbent packed into the column was passed through each column in one hour (S.V. = 20), and thereafter the ratio of the heavy metal ions adsorbed by each adsorbent was examined. The results were nearly equal to those shown in Table 1, so that it was confirmed that the adsorbent according to the present invention can be used advantageously for column packing.

EXAMPLE 2

4.1 parts of a 40% aqueous solution of glyoxal was mixed uniformly with 200 parts of an excess activated sludge slurry similar to that used in Example 1, and the mixture was subjected to the same operation as in Example 1 to obtain a granular substance. The thus-obtained granules were resistant to fracture with water and had excellent mechanical strength. The adsorbing power for heavy metal ions by the granules was evaluated for Cd ions. The concentration of Cd ions remaining in the filtrate was found to be 0.79 p.p.m. (adsorbing ratio: 92.1%), which showed a satisfactory adsorbing effect.

EXAMPLE 3

One part of the water-soluble primary condensate of phenol-formalin resin (Riken-302 produced by Showa Kobunshi Co.) and 2.5 parts of a 40% aqueous solution of glyoxal were mixed with 200 parts of an excess activated sludge slurry (solid matter content: 10.0%) formed by a similar treatment to that performed in Example 1. After the water content of the thus-obtained mixture was adjusted (dried) to 55%, the mixture was subjected to the same operation as in Example 1 to produce the final product (adsorbent). The thus-obtained granules had an excellent mechanical strength and were resistant to fracture with water. The adsorbing ratio for Cd ions was 92.5%, showing a satisfactory value.

EXAMPLE 4

2.0 parts of the same primary condensate of melamine resin as used in Example 1 and 2.0 parts of sodium carbonate were uniformly mixed with 108 parts of a solid obtained by adding a high molecular weight coagulant to a similar excess activated sludge slurry (solid matter content: 12.0%) formed by the same treatment as in Example 1, filtering the coagulated sludge slurry and drying it. The mixture was then formed into granules by the same operation as in Example 1. The granules thus obtained were then put into an aqueous solution of hydrochloric acid adjusted to pH 2.5, and the treatment was continued until the generation of carbonic acid gas ceased. The granules were then dried. The granules thus obtained represented a very high porosity and had a satisfactory mechanical strength. Adsorption tests for heavy metal ions were carried out using the granules. As shown in Table 2, it was confirmed that the granules according to the present invention can exhibit an excellent adsorbing effect.

Table 2

| Adsorption ratio for heavy metal ions (%) | | |
| --- | --- | --- |
| Pb | Cd | Co |

Table 2-continued

| 97.1 | 93.4 | 92.5 |
| --- | --- | --- |

The above-mentioned granules were packed into columns so that each column was filled to 50 volume %. 1000 volume % of a solution of each kind of the above-mentioned heavy metal ions was passed through each column in one hour (S.V. = 20). Thereafter, the concentration of the heavy metal ions remaining in the filtrate was measured. The results were nearly equal to those in Table 2.

EXAMPLE 5

One part of the primary condensate of phenol-formalin resin used in Example 3, 0.1 part of polyacrylamide and 0.1 part of calcium carbonate were mixed uniformly with 200 parts of activated sludge slurry (solid matter content: 8.3%) similar to that used in Example 1. The mixture was produced into granules by the same operation as in Example 1. The granules were then subjected to the same acid solution treatment as in Example 4 to produce the final product. The granules thus obtained had an excellent mechanical strength and were resistant to fracture with water. The adsorption ratio for Cd ions was 97.9%, showing a satisfactory result.

EXAMPLE 6

2.0 parts of a 40% aqueous glyoxal solution and 0.1 part of carboxymethyl cellulose were mixed uniformly with 100 parts of an excess activated sludge slurry (solid matter content: 8.2%) formed by the activated sludge treatment of a civil sewage. The mixture was then formed into granules by the same operation as in Example 1. The granules thus obtained had an excellent mechanical strength and did not disperse in water. 100 mg of the granules were put into 100 ml of an aqueous solution, adjusted to pH 3, containing an anionic dye (dye concentration: 10 mg/l), and the solution was stirred for one hour to keep the granules in contact with the solution. The granules were then filtered off. It was confirmed that no substantial dye remained in the filtrate.

What we claim is:

1. An adsorbent for the treatment of waste water, comprising a granular material containing activated sludge, said granular material being prepared by subjecting a mixture containing (1) 100 weight parts of an activated sludge-containing material, calculated on a dry weight basis, formed by subjecting organic waste water to an activated sludge treatment, and (2) at least 5 weight parts of a water-soluble primary condensate of a formaldehyde resin and/or a dialdehyde compound selected from the group consisting of glyoxal, malondialdehyde, succindialdehyde and phthaldialdehyde, to a heat curing treatment at 60° to 250° C. and to a granulating operation.

2. The adsorbent as claimed in claim 1 wherein said mixture further contains at least 0.5 weight part, per 100 parts of the activated sludge-containing material, of a carbonate selected from the group consisting of sodium carbonate, sodium hydrogen carbonate, potassium carbonate, potassium hydrogen carbonate, ammonium carbonate, ammonium hydrogen carbonate, magnesium carbonate and calcium carbonate, uniformly mixed with said activated sludge-containing material, and the granular material, after the heat curing treatment, is treated with a solution of an acid selected from the group consisting of hydrochloric acid, sulfuric acid, nitric acid, acetic acid and partoluenesulfonic acid, said solution having a pH below 6.0.

3. The adsorbent as claimed in claim 1 wherein said mixture further contains at least 0.5 weight part, per 100 parts of the activated sludge-containing material, of a water-soluble polymer selected from the group consisting of polyvinyl alcohol, polyacrylic acid, polyvinylpyrrolidone, polyacrylamide, polyethylene glycol, polystyrenesulfonic acid, polyvinyl acetate, carboxymethyl cellulose, starch, alginic acid, pectinic acid, humic acid and agar-agar, uniformly mixed with said activated sludge-containing material.

4. The adsorbent as claimed in claim 1 wherein said mixture further contains at least 0.5 weight part, per 100 parts of the activated sludge-containing material, of a carbonate selected from the group consisting of sodium carbonate, sodium hydrogen carbonate, potassium carbonate, potassium hydrogen carbonate, ammonium carbonate, ammonium hydrogen carbonate, magnesium carbonate and calcium carbonate, and a water-soluble polymer selected from the group consisting of polyvinyl alcohol, polyacrylic acid, polyvinylpyrrolidone, polyacrylamide, polyethylene glycol, polystyrenesulfonic acid, polyvinyl acetate, carboxymethyl cellulose, starch, alginic acid, pectinic acid, humic acid and agar-agar, uniformly mixed with said activated sludge-containing material, and the granular material, after the heat curing treatment, is treated with a solution of an acid selected from the group consisting of hydrochloric acid, sulfuric acid, nitric acid, acetic acid and paratoluenesulfonic acid, said solution having a pH below 6.0.

5. The adsorbent as claimed in claim 3 wherein the mixing ratio of the water-soluble polymer is 5 to 30 weight parts per 100 parts of the activated sludge-containing material.

6. The adsorbent as claimed in claim 4 wherein the mixing ratio of the carbonate and the water-soluble polymer is 5 to 30 weight parts per 100 of the activated sludge-containing material.

7. The adsorbent as claimed in claim 1 wherein said organic waste water is of industrial waste water discharged from an acrylic fiber production plant.

8. The adsorbent as claimed in claim 1 wherein said dialdehyde compound is glyoxal.

9. The adsorbent as claimed in claim 1 wherein the mixing ratio of the primary condensate of a formaldehyde resin and/or the dialdehyde compound is 10 to 100 weight parts per 100 weight parts of the activated sludge-containing material.

10. The adsorbent as claimed in claim 2 wherein the mixing ratio of the carbonate is 5 to 30 weight parts per 100 parts of the activated sludge-containing material.

11. The adsorbent as claimed in claim 1 wherein, prior to the heat curing treatment and the granulating operation, the water content of said mixture is adjusted to 40 to 80%.

* * * * *